United States Patent
Florence et al.

(10) Patent No.: US 7,583,795 B1
(45) Date of Patent: Sep. 1, 2009

(54) SWITCHED-ACCESS NETWORK OPTIMIZATION METHODOLOGY

(75) Inventors: Mary Klavetter Florence, Kansas City, MO (US); Sharon Gauert, Overland Park, KS (US); David Frederick Lynch, Freehold, NJ (US); Moshe Segal, Tinton Falls, NJ (US); Kenneth S. Wonnell, McLouth, KS (US)

(73) Assignee: AT&T Intellectual Property II, L.P., Reno, NV (US)

( * ) Notice: Subject to any disclaimer, the term of this patent is extended or adjusted under 35 U.S.C. 154(b) by 805 days.

(21) Appl. No.: 11/214,410

(22) Filed: Aug. 29, 2005

Related U.S. Application Data

(60) Provisional application No. 60/611,013, filed on Sep. 16, 2004.

(51) Int. Cl.
*H04M 15/00* (2006.01)
*H04M 7/00* (2006.01)

(52) U.S. Cl. .................. 379/133; 379/111; 379/112.01; 379/112.05; 379/112.06; 379/114.01; 379/134; 379/220.01; 379/221.02; 379/224

(58) Field of Classification Search .................. 379/111, 379/112.01, 112.06, 114.01, 133, 134, 220.01, 379/221.02, 224, 112.05
See application file for complete search history.

(56) References Cited

U.S. PATENT DOCUMENTS

| | | | | |
|---|---|---|---|---|
| 5,564,021 | A | * | 10/1996 | Qiu et al. ..................... 370/460 |
| 5,703,938 | A | * | 12/1997 | Lucas et al. ............. 379/112.05 |
| 5,832,069 | A | * | 11/1998 | Waters et al. .......... 379/115.01 |
| 6,779,034 | B1 | | 8/2004 | Mundy et al. |

* cited by examiner

*Primary Examiner*—Ahmad F Matar
*Assistant Examiner*—Nafiz E Hoque

(57) ABSTRACT

A methodology for optimizing the access charges paid by a long distance carrier involves the use of a "sizing" operation to determine the optimal balance between direct trunks and access tandems (on a per LATA basis) so as to provide minimal access charges. Once the sizing has been completed, a mixed integer program is used to find the optimal MUX assignments for each LATA. The sizing operation is then re-visited, based on the MUX assignments, to determine if adjustments are required to reduce costs. Any changes in the sizing are then reviewed in the MUX assignment mixed integer program. The end result is a definition of the quantity of direct trunks, access tandem trunks and overflow minutes-of-use charges for each end office, as well as the number of high capacity facilities required for each MUX.

7 Claims, 9 Drawing Sheets

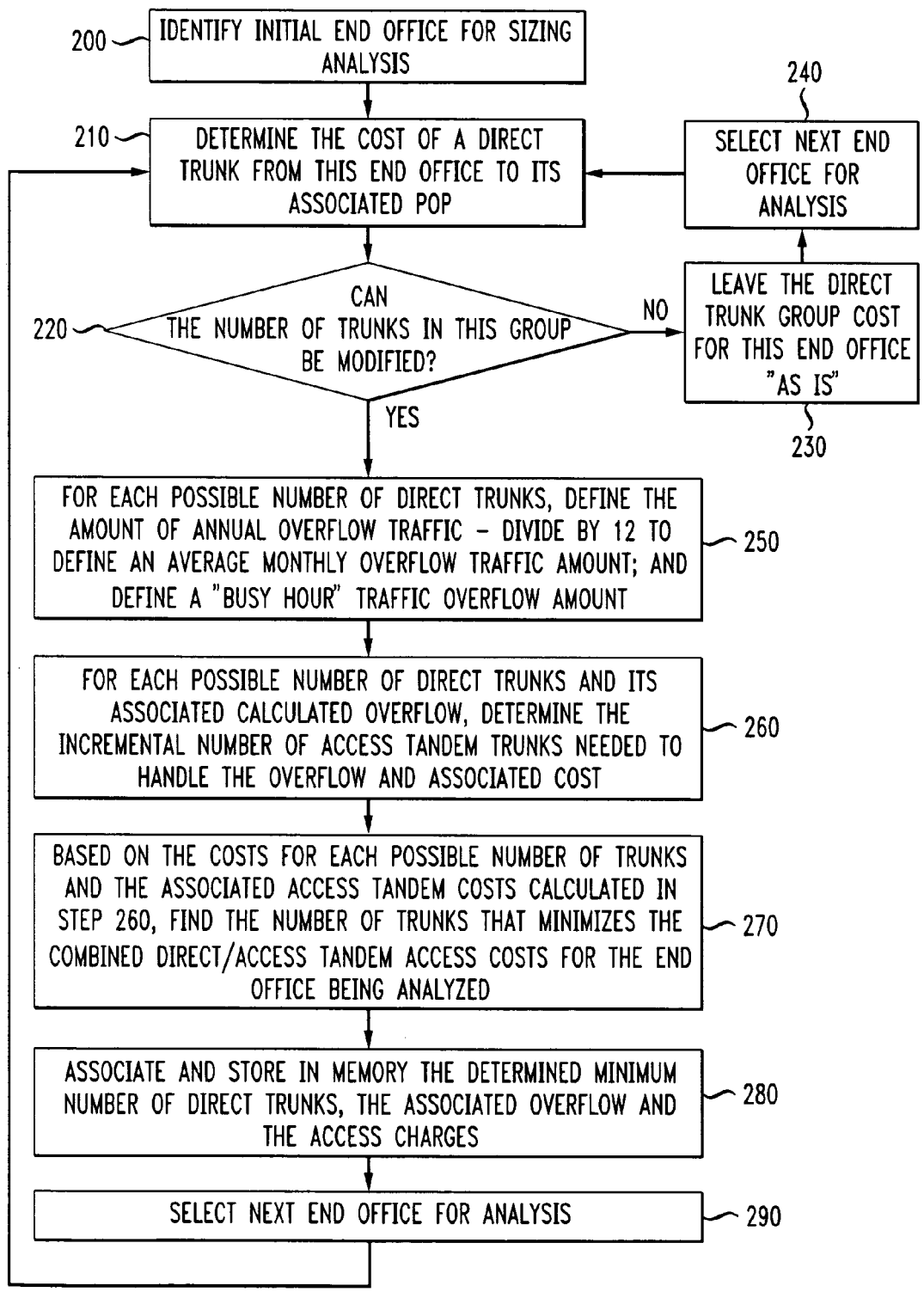

FIG. 13

| Sav | Name | ATDM | NT/NST | MUX Opt | AT&T Switch | AT&T Switch | NRC | OCMS | OEMS |
|---|---|---|---|---|---|---|---|---|---|
| ☐ | Tarkowsid Michael | TULSOKTB03T | AC/POTS | | TULSOKTB04T | 06 Sep 2003 | 8,100.00 | 49,085.38 | 30,501.86 |
| ☐ | Tarkowsid Michael | OKCYOKCE13T | AC/POTS | | OKCYOKCE04T | 05 Sep 2003 | 18,400.00 | 44,089.73 | 21,376.41 |
| ☐ | Tarkowsid Michael | ENIDOKMA02T | AC/POTS | | OKCYOKCE04T | 05 Sep 2003 | 4,584.00 | 12,875.52 | 13,265.80 |
| ☐ | Tarkowsid Michael | ORNTOKMA02T | AC/POTS | | OKCYOKCE01T | 05 Sep 2003 | 3,958.00 | 14,754.88 | 10,746.15 |
| ☐ | Tarkowsid Michael | OKCYOKMA13T | LC/TTA | | OKCYOKCE01T | 05 Sep 2003 | 1,444.00 | 28,182.78 | 7,692.94 |
| ☐ | Tarkowsid Michael | LWTNOKB02T | AC/POTS | | OKCYOKCE04T | 05 Sep 2003 | 5,840.00 | 9,052.18 | 8,892.84 |
| ☐ | Tarkowsid Michael | TUBOKTB03T | LC/TTA | | OKCYOKCE01T | 05 Sep 2003 | 815.00 | 5,552.53 | 6,518.07 |

SWITCHED-ACCESS NETWORK OPTIMIZATION METHODOLOGY

CROSS-REFERENCE TO RELATED APPLICATION

This application claims the benefit of Provisional Application No. 60/611,013, filed Sep. 16, 2004.

TECHNICAL FIELD

The present invention relates to a methodology for optimizing the cost structure associated with access charges incurred by network service providers when handing off communications traffic to a local service provider.

BACKGROUND OF THE INVENTION

Prior to Jan. 1, 1994, all telecommunications switched traffic traversing through a long distance carrier network into a local exchange area was charged an "access" cost based on an equal cost-per-minute basis, with the only modification being that the so-called airline miles between the end office in the local exchange carrier network and the first switch accessed in the long distance network was taken into account. As a result, the cost that was charged to a long distance carrier was substantially independent of the actual route the traffic took through the local exchange area to the end users. Accordingly, the only cost issue for a long distance carrier was to determine the particular "grade of service" to be charged for various calls. In other words, the long distance carrier did not have to worry about how the calls themselves were carried by the local access providers, as long as the calls reached the end users.

All of that changed when the Federal Communications Commission (FCC) announced that after Jan. 1, 1994, the "access charges" paid by long distance carriers would more accurately reflect the true cost of access. To introduce this restructuring of the cost the FCC introduced the concept of local transport restructuring (LTR). In essence, LTR separates the switched access costs into three different components: (1) the cost charged by an access provider for a long distance carrier to use its facilities connecting a carrier's "point-of-presence" (POP) to a switch in the local exchange network (the "Entrance Facility charge"); (2) a fixed "per mile" cost for direct trunk lines into the local exchange area that are leased by a long distance carrier; and (3) overflow traffic volume from leased direct trunks onto the local exchange's "tandem" trunks, where this cost factor comprises both a minutes-of-use charge and a cost of the trunk groups from the tandem switch to the POP.

As of today, there is an alternative form of access network pricing, referred to as Equal Change Rule (ECR) pricing, available to the long distance carrier. Under ECR pricing, access changes are based solely on the number of minutes of use and the number of miles between a subscriber's local exchange carrier end office (EO) and the long distance carrier's POP.

In view of the changes to the cost structure, from the perspective of a long distance carrier or a wide area service provider, a cost problem has evolved that is essentially defined as a capacity problem. That is, the long distance service provider needs to determine, in advance, how many direct trunks it should lease, and how much traffic should be allowed to overflow onto tandem trunks, in order to achieve a specific grade of service for its subscribers, at a minimum cost. Given the fact that a long distance carrier pays out a significant portion of its revenue as "access charges", the ability for a long distance carrier to optimize its access trunk configurations so as to minimize its access costs is of strategic importance.

Various attempts have been made to develop a rules-based approach for determining the optimal balance between direct trunks and access tandem trunks. While helpful in determining the balance for a rather "static" and predictable volume of traffic, these tools have not been able to handle the complexities associated with factors such as, for example, parallel trunk groups, multiple tandem switches for a single end office, variations in traffic peaks, day-to-day variations in traffic, or seasonal variations in traffic.

Thus, a need remains in the art for a methodology that may be used by managers of large, complex long distance networks to optimize its use of access facilities into a local exchange area.

SUMMARY OF THE INVENTION

The need remaining in the art is addressed by the present invention, which relates to a methodology for optimizing the cost structure associated with access charges incurred by network service providers when handing off communications traffic to a local service provider. More particularly, the present invention is directed to the use of a pair of separate "optimization modules" that are iterated to determine the optimal arrangement on a cost basis. A first optimization module (referred to as a "sizing" module) is used to determine the optimal number of direct trunks, as well as the balance between direct trunks and access tandem trunks for each end office location. A second optimization module (referred to as a "location" module) utilizes a mixed-integer program model to determine the optimal multiplexing arrangement for a defined geographic area of the access network, such as a Local Access Transport Area (LATA). The iteration between these two modules will then determine a minimum-cost switched access network arrangement between the long distance carrier and the local exchange area.

It is an aspect of the present invention that the utilization of the separate modules allows for the analysis to be parsed in a manner such that complexities such as parallel trunk groups, end offices assigned to more than one access tandem, and direct-final trunk groups can be considered. Furthermore, the dual-module iteration approach can be enhanced to recommend "seasonal" trunk group adjustments based on variations in traffic. The inclusion of a separate "multiplexing" optimization module further allows for the methodology to be enhanced so as to integrate switched access with wide area nodal services when necessary.

Other and further aspects and advantages of the present invention will become apparent during the course of the following discussion, and by reference to the accompanying drawings.

BRIEF DESCRIPTION OF THE DRAWINGS

Referring now to the drawings,

FIG. 3 is a detailed flowchart of an exemplary process for performing the "sizing" module of the present invention, related to the number and cost of direct trunks and access tandems;

FIG. 13 illustrates an exemplary "screen shot" of the access charge optimization results available for review by the long distance carrier.

DETAILED DESCRIPTION

Figure 1:
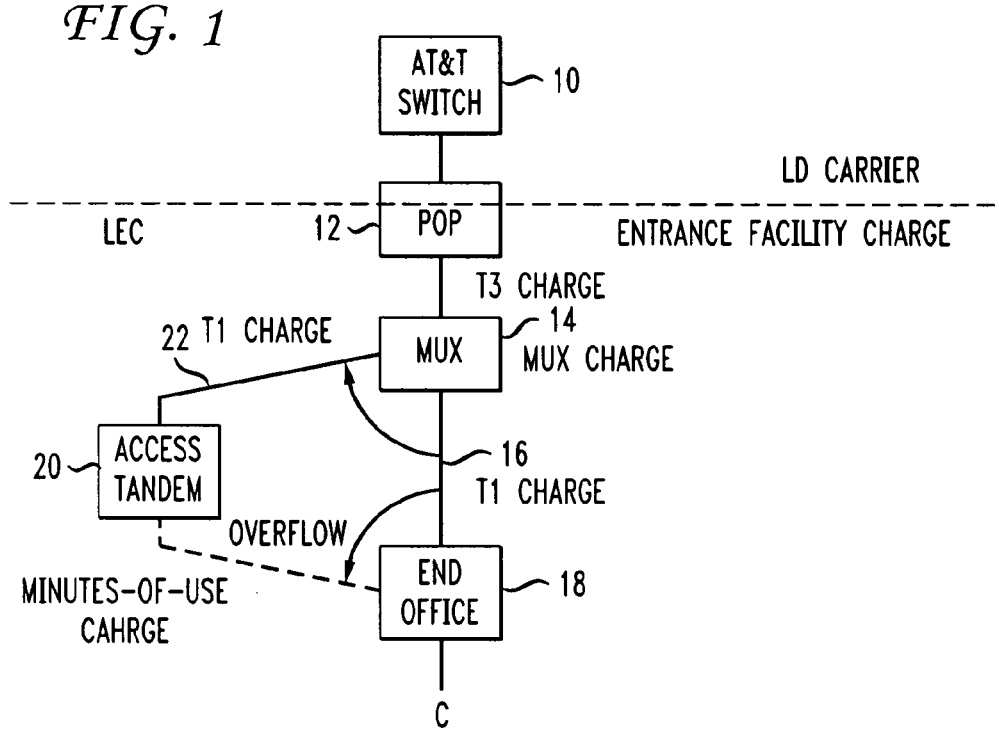
FIG. 1 illustrates, in simplified form, a portion of the interconnection between a long distance carrier's network and a local exchange area, particularly illustrating the various components involved in access charges.

FIG. 1 illustrates, in simplified form, a portion of the interconnection between a long distance carrier's network and a local exchange network, helpful in understanding the utilization of the methodology of the present invention. The long distance carrier's network, defined as being "above" the dotted line, includes a number of switches, such as switch 10. In most cases, a call destined for a customer (denoted as "C") in FIG. 1, will be carried through the long distance carrier's network, pass through switch 10 and enter the local exchange area at the carrier's point-of-presence (POP) 12. The call may then pass through a multiplexing, high capacity facility 14 (not always the case) and onto a direct trunk line 16, leased by the long distance carrier, where direct trunk line 16 is connected to end office 18 associated with customer C. A number of direct trunks are conventionally in place between a given MUX 14 and end office 18, referred to as a "trunk group". If there are no direct trunks available, the call may overflow to an access tandem switch 20, which also connects to end office 18. As discussed above, the LTR cost structure includes an "entrance facility charge" at POP 12, a leasing cost for direct trunk group 16 and tandem trunk group 22, a "per-minute" use charge for access tandem switch 20, and a cost for using the high capacity facilities between the multiplexer and the POP, as well as various other incidental charges.

Figure 2:
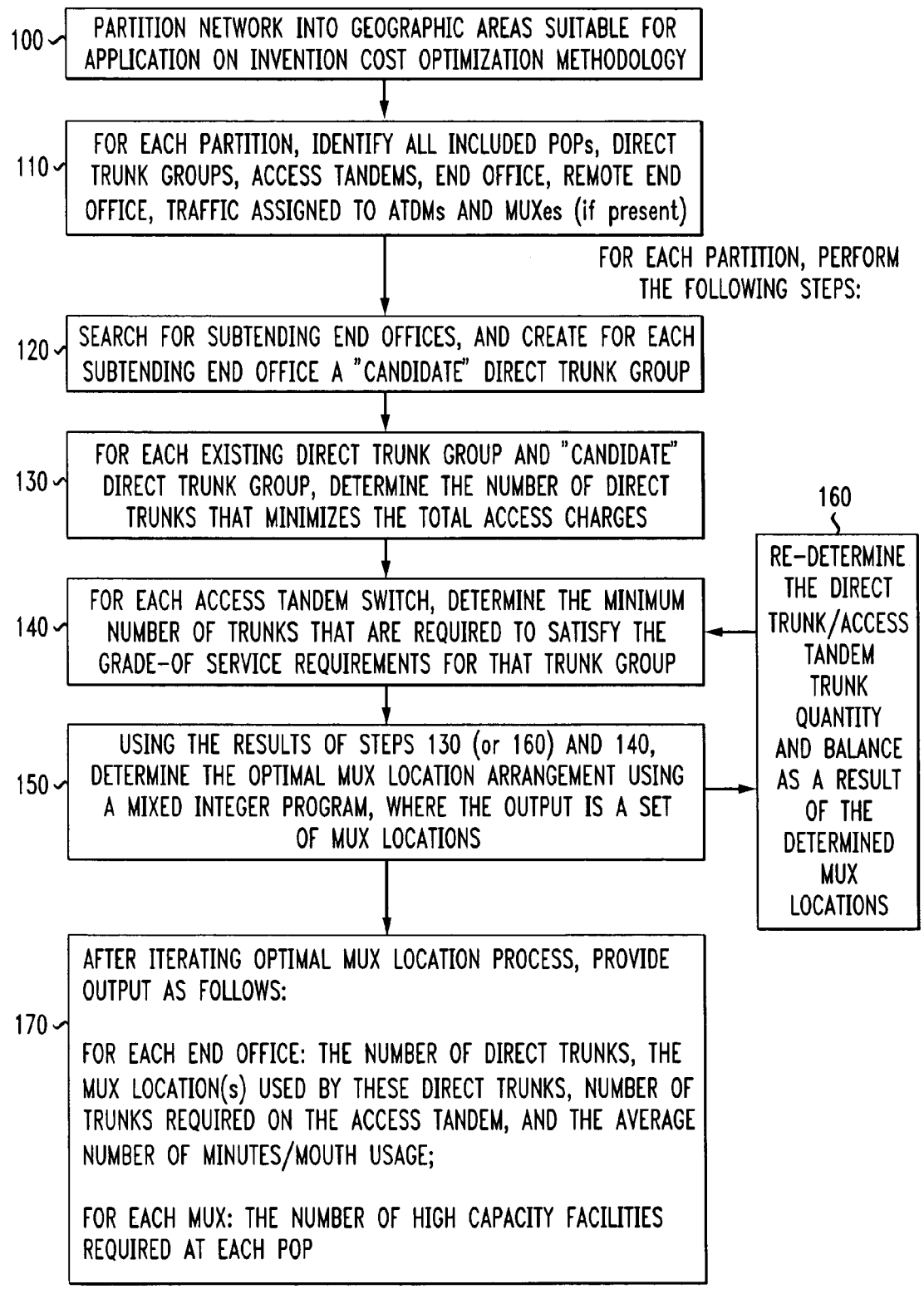
FIG. 2 contains a flowchart of the access charge optimization methodology of the present invention.

With this understanding of the inner workings of call flow between a long distance carrier's network and a local exchange area, the following discussion of the access cost optimization methodology of the present invention will be better understood. FIG. 2 contains a high level flow chart illustrating the overall access cost optimization process of the present invention.

As a result of the sheer size of the switched access network, the first step in the inventive process is to partition the problem of optimizing access charges into manageable units, defined as step 100 in the flow chart of FIG. 2. Forming partitions that are too large unnecessarily increases the computational complexity of the methodology without any true benefit, while forming partitions that are too small will sacrifice some of the potential savings from sharing network resources. Since most traffic is required to pass through a POP in the same LATA, most network resource sharing naturally occurs between traffic in the same LATA. Thus, the access network cost optimization problem is addressed in accordance with the present invention by partitioning the access network on a LATA by LATA basis. Other partitioning arrangements, however, may be used if more suitable for a given network topology.

The next step in the process is to define, within each partition, the particular network elements that contribute to the costs for access to the local area network (step 110). For the purposes of the present discussion, a LATA partition will be defined to include all of the POPs and access tandem switches in that LATA, all of the trunk groups passing through any of the POPs, and all of the trunk multiplexing locations (hereinafter referred to as a "MUX"), as well as all of the end offices, remote end offices, and traffic assigned to any of the tandem switches. It is to be noted that any traffic from these end offices that is assigned to a tandem in a different LATA will be considered as part of that partition. Thus, all switched access traffic can be uniquely assigned to a single LATA partition. Further, it is possible that a given LATA partition may contain end offices from other LATAs, and some end offices may be part of more than one LATA partition. However, traffic from one LATA partition will not be "mixed" (that is, put on the same trunk group) with traffic from any other LATA partition.

Once the LATA partitions are established, the direct and tandem trunk groups are independently sized (the "sizing" module of the inventive process), and then optimized with the associated MUX assignments (the "location" module of the inventive process). In particular, for each LATA, the following steps are initially performed:

First determine a set of "candidate" direct trunk groups (step 120). This determination begins with a search in the current LATA for any existing "subtending" end offices, where a subtending end office is defined as an end office that does not currently have an associated direct trunk group, and thus needs to route all of its traffic through an access tandem. A "candidate" direct trunk group is then created for each subtending end office. If different traffic parcels at an end office are assigned to different access tandems or different switches, then an end office may have more than one direct trunk group;

Once any "subtending" end offices have been identified and associated "candidate" trunk groups have been defined, the next step (step 130) is used to determine the number of trunks that should be included in each trunk group (both existing and candidate) that minimizes the sum of the direct trunk charges, the tandem overflow minutes-of-use charge and the incremental tandem trunking charges. This optimization, as discussed in detail below in association with FIG. 3, should be based on a reliable forecast of traffic data, for example, twelve months of hourly traffic data (for example, 24 values for an average business day, Saturday and Sunday for each of the 12 months);

Then, for each access tandem trunk group, determine the minimum number of trunks (as a multiple of, for example, 24) that are necessary to satisfy the grade-of-service requirements for that particular access tandem trunk group (step 140).

The above steps thus provide a numerical solution for the "least cost" number of direct trunks and access tandem trunks to allow access from a given long distance carrier into a local exchange area; the completion of the "sizing" module of the optimization methodology of the present invention. This cost solution, however, does not take into consideration the possibility of the existence of multiplexers (and associated high capacity facilities) that may be used within a given LATA partition. Therefore, the next step in the inventive optimization process (step 150) initiates the "location" module to define the number of multiplexers (MUX's) in a given LATA partition and determine the optimal location(s) for the MUX elements (if it is possible to manipulate the topology of the MUX's in the LATA). In any case, the use of a MUX between a given POP and end office will affect the cost of routing traffic to each end office. As will be discussed in detail below, a mixed integer program is formed and solved to determine the optimal MUX locations where the variables are the number of trunks from each end office or access tandem to each MUX location and POP, the constraints are the total required number of trunks at each location, and the cost coefficients are the appropriate trunk and MUX costs.

Once the MUX design is determined, it is contemplated that this solution may affect the cost of the trunk groups, which in turn may affect the optimal balance between direct and tandem trunk groups, as determined by the above "minimum cost" steps. Therefore, the next step in the process (step 160) is to re-visit the direct vs. tandem decision at each end office in light of the actual MUX design. That is, given the existing MUX placement and trunk homing, a new determination is made as to whether the total cost at the end office can be reduced by increasing or decreasing the total number of direct trunks. If the total number of direct trunks is modified, then the number of trunks for the associated access tandem trunk group(s) is re-adjusted as well.

Lastly, the updated trunk information is used to repeat the MUX location optimization process of step 150, in order to determine if any changes in MUX assignment/location would reduce the overall access charges.

The "output" data from the optimization process of the present invention thus includes, as shown in step 170 for each end office, the number of direct trunks, the MUX location used by these trunks (if any), the number of trunks required on the access tandem trunk group, and the average number of minutes per month of usage on the access tandem that yields the "least cost" for the long distance carrier. For each MUX location, the number of high capacity facilities (such as, for example, T3 facilities) required to each POP is also provided.

It is to be understood that if the option of optimizing MUX locations is not available, the analysis is completed once the trunk sizing steps have been completed. Another embodiment of the present invention would be to perform the iteration of steps 140, 150 and 160 for two or more iterations, or to stop the iteration when the solution no longer changes. Also, to reduce unnecessary churn, all direct trunk group size changes should satisfy a minimum savings threshold, where if the savings produced by the optimization is less than a certain value, the change is not implemented. Each of the above-defined process steps will now be discussed in detail below.

Direct Trunk Group Sizing

As mentioned above, the first "module" of the two-module optimization methodology of the present invention relates to "sizing" the trunk groups—determining the most cost-effective number of direct trunks and access tandem trunks, as well as the optimal balance between direct trunks and associated access tandem trunks. Step 130 (and step 160) of the process flowchart in FIG. 2 is associated with this module. The flowchart of FIG. 3 illustrates, in more detail, the individual steps that may be used to obtain this minimum cost for each partition (e.g., LATA).

The process begins, as shown, by identifying a first end office for which the cost minimization process is to be used (step 200). Then, for the identified end office, the cost of a direct trunk from this end office to the assigned POP is determined (step 210). In some instances, the long distance carrier is unable to modify the number of trunks that the carrier "purchases" in a given trunk group. Therefore, the next step in the process (step 220) is to determine if the carrier has the proper permissions to adjust the number of trunks. If not, the cost determined in step 210 is associated with this end office (step 230), and the process selects the next end office to be studied (step 240), and the process returns to step 210. Otherwise, if the number of individual trunks can be adjusted, a determination is made (step 250) for each possible number of trunks (as a multiple of, for example, 24) on that direct trunk group, the amount of traffic that would overflow to an associated tandem for the entire year, as well as the amount that would overflow during the "busy hour". The yearly amount is then divided by 12 to obtain an average monthly overflow. Obviously, at one extreme, if "zero" direct trunks are selected, then all of the traffic would overflow to the access tandem switch. Conversely, if the number N of direct trunks is large enough, then "zero" traffic would ever overflow to the access tandem (although this may be a more expensive alternative). It is to be understood that instead of performing the optimization process on a "per end office basis", another embodiment of the present invention may provide the optimization on a "per direct trunk group" basis. In principle, the same assessment is performed regardless if based on a "per end office" or "per direct trunk group" evaluation.

In the next step (step 260), the incremental number of trunks required on the tandem trunk group and the incremental tandem trunk cost and MOU cost, as well as the total direct trunk cost, is then determined for each number of direct trunks. The incremental number of tandem trunks is assumed to be directly proportional to the incremental busy hour offered load. The ratio of trunks to offered erlangs at the 1% blocking level ranges from 1.17 (for 100 erlangs) to 1.054 (for 500 erlangs). For most cases a factor of 1.1 (representing 220 erlangs) is used. This factor may be re-examined, taking into consideration peakedness and day-to-day variations, as well as the actual tandem trunk group sizes.

Once this additional costing step is accomplished, a number of direct trunks is selected for the end office under evaluation that minimizes the total cost from the direct trunk group and its overflow (step 270). It is to be noted that the optimal number of direct trunks could be "zero", or large enough so that no traffic overflows to the tandem. If, indeed, all of the traffic is routed on the direct trunk group, then there must be enough trunks to meet the trunk group blocking objective. The optimized cost information for this end office (i.e., "cost", number of direct trunks, number of access tandem trunks) is recorded against this office (step 280), and the process loops back to select the next end office for evaluation (step 290) and begin the costing process for this end office at step 210.

Figure 4:
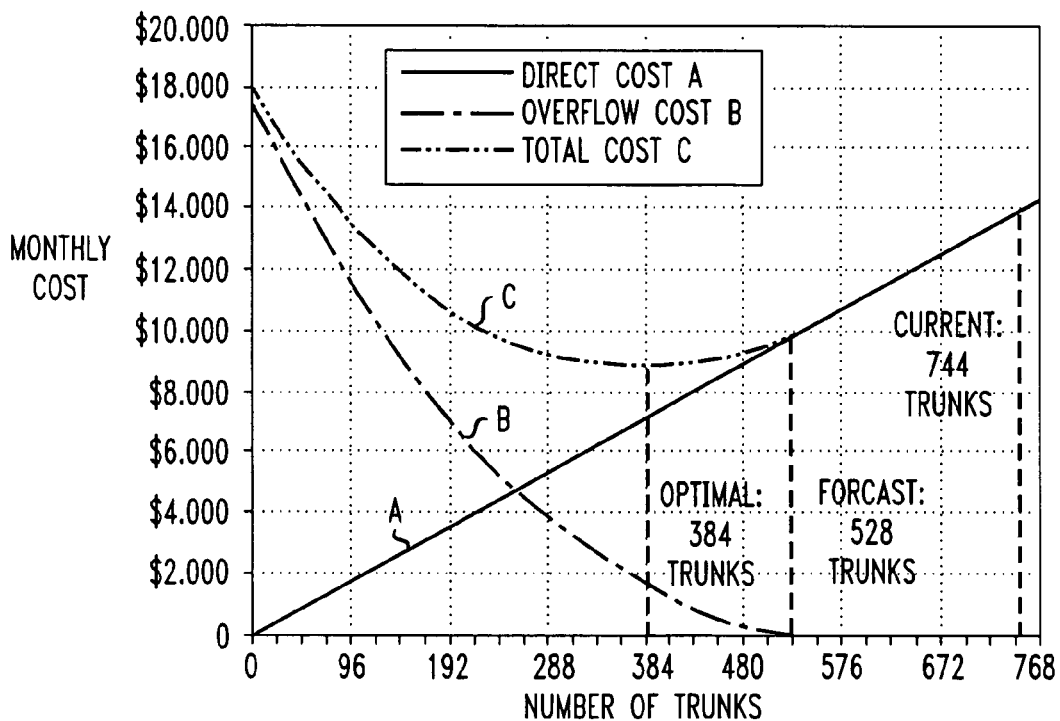
FIG. 4 is a plot illustrating the trade-off between the number of direct trunks and monthly costs for an exemplary end office.

FIG. 4 contains a graph illustrating the change in direct, overflow and total costs (on a monthly basis) as the number of direct trunks changes (that is, during the analysis of steps 250-270). Curve A is associated with the cost of increasing the number of direct trunks, where as shown, the direct cost increases linearly with the number of additional direct trunks. Overflow costs, as shown in curve B, are shown to decrease nonlinearly. The combination of costs from curves A and B results in the total cost, as illustrated in curve C. In this particular example, a conventional prior art optimization method would suggest the use of 528 direct trunks (where the charges associated with overflow approaches a minimum). However, by following the methodology of the present invention, as outlined above in the flowcharts of FIGS. 2 and 3, access charges are actually minimized when only 384 direct trunks are used. As shown, a savings of approximately $1000 per month for this LATA partition is realized when reducing the group size to 384 direct trunks.

Figure 5:
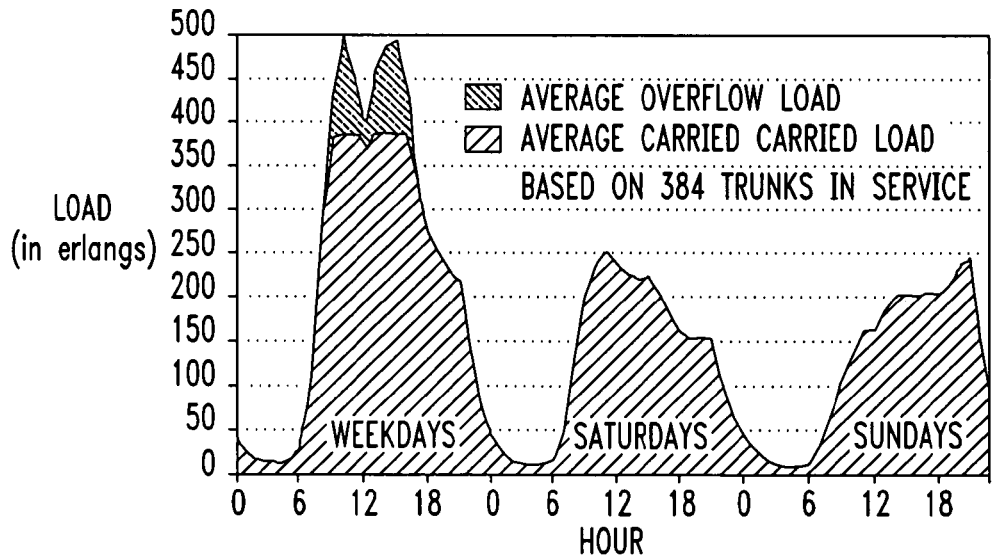
FIG. 5 is a chart of hours vs. load (in erlangs) for weekday traffic, and weekend traffic, using the exemplary number of direct trunks as "sized" using the process associated with the flowchart of FIG. 3.

The average weekly traffic pattern for this same direct trunk group is illustrated in FIG. 5. With 384 trunks dedicated to the direct trunk group, most of the traffic is carried on these direct trunks, while only the peak weekday load will experience overflow. In this case, therefore, it is more cost effective to route some overflow traffic over the tandem and pay the tandem minutes-of-use charge, plus the extra tandem charge, than it is to pay for leasing additional dedicated direct trunks that would be used only a few hours a week.

It is to be noted that the total cost curve (curve C) is "U"-shaped. Therefore, when evaluating the direct and overflow costs, the evaluation can be terminated once the total cost begins to increase. That is, once the minimum cost has been ascertained, further evaluations of increasing the number of direct trunks is unnecessary.

Tandem Trunk Group Sizing

In order to properly determine the minimum number of tandem trunks that are required (as a multiple of, for example, 24), both the peakedness and day-to-day variation of the traffic for the particular LATA need to be studied. Each tandem trunk group must satisfy two grade-of-service parameters: one for weekdays and one for weekends. Prior art methods of performing this determination (such as, for example, using the well-known Neal-Wilkinson method) may be used, once the proper "least cost" number of direct trunks has been determined, as outlined above.

Multiplexer Assignment Optimization

Once the access tandem trunk group sizing is completed, the MUX "location" module of the inventive methodology is utilized, the module associated with the optimal assignment of MUX's in the LATA partition under evaluation. Indeed, this second module encompasses the optimal assignment of trunks from the endpoints (including both end offices and tandems) to multiplexer locations. The MUX assignment is accomplished in accordance with the present invention by solving a mixed-integer programming model, using the following parameters:

$c_e$: cost of a trunk from endpoint e to its POP;

$c_{em}$: cost of a trunk from endpoint e to MUX location m;

$c_m$: cost of a multiplexer and a high capacity facility from MUX location m to its POP; and $D_e$: total number of trunks required at endpoint e, as determined by the sizing module.

In addition to the tariffed monthly recurring charges, these costs should also include the non-recurring (i.e., installation) charges divided by the predefined payback period (e.g., 6 months). To reduce churn, as noted above, the costs should also include a minimum savings charge whenever the homing point (POP or MUX location) is different from the current homing point. The decision variables can be defined as follows:

$x_e$: number of trunks from endpoint e to its POP;

$y_{em}$: number of trunks from endpoint e to MUX location m; and $z_m$: number of high capacity facilities from MUX location m to its POP.

Then, the objective function for this second module is simply to minimize the total cost of the direct trunks and high capacity facilities:

$$\text{Min} \sum_e c_e x_e + \sum_e \sum_m c_{em} y_{em} + \sum_m c_m z_m.$$

The total number of direct trunks at each endpoint must equal the total demand, as defined by the following relation:

$$x_e + \sum_m y_{em} = D_e, \forall e.$$

Additionally, there must be a sufficient number of high capacity facilities at each MUX location to carry the trunks that are homed to that location, as defined by the following:

$$\sum_e y_{em} - 28 z_m \leq 0, \forall m.$$

Finally, all of the variables must be positive and the number high capacity facilities must be an integer:

$x_e, y_{em}, z_m \geq 0, \forall e, m$ $z_m$ integer $\forall m$.

While this formulation will yield an optimal MUX configuration, it is possible that the trunks from the same endpoint could be assigned to two or more different MUX locations (in order to reduce the number of high capacity facilities in the network). Although it is feasible to structure the network in this fashion, it is difficult to implement. To prevent this type of dual MUX assignment from occurring, therefore, additional binary variables may be introduced into the inventive methodology to utilize an additional set of constraints. Consider the following binary variables:

$u_e$: equals "1" if there is at least one trunk from endpoint e to its POP; and $v_{em}$: equals "1" if there is at least one trunk from endpoint e to MUX location m.

The binary variable corresponding to a homing point must be set if there is one or more direct trunks to that homing point:

$x_e - D_e u_e \leq 0 \forall e$ $y_{em} - D_e v_{em} \leq 0, \forall e, m.$

An endpoint may have trunks to no more than one homing point (that is, no more than one binary variable can be set for any endpoint)

$$u_e + \sum_m v_{em} \leq 1 \forall e$$

The addition of these constraints yields the following expanded formulation:

$$\text{Min} \sum_e c_e x_e + \sum_e \sum_m c_{em} y_{em} + \sum_m c_m z_m$$

$$s.t. \quad x_e + \sum_m y_{em} = D_e \ \forall \ e$$

$$\sum_e y_{em} - 28 z_m \leq 0 \ \forall \ m$$

$$x_e - D_e u_e \leq 0 \ \forall \ e$$

$$y_{em} - D_e v_{em} \leq 0 \ \forall \ e, m$$

$$u_e + \sum_m v_{em} \leq 1 \ \forall \ e,$$

where
$x_e, y_{em}, z_m \geq 0 \ \forall e, m$
$z_m$ integer $\forall m$
$u_e, v_{em} \in \{0,1\} \ \forall e,m$.

This formulation assumes that the high capacity facilities are being used exclusively by switched access. In the actual network, most high capacity facilities and multiplexers are shared between switched access and nodal (data) services. Two alternatives are available for handling this situation. If it is possible to rearrange the nodal services multiplexing arrangement, then additional parameters and variables can be added to represent the total number of direct trunks required at each nodal office and the number of nodal direct trunks homed to each MUX location. If the nodal services network may not be rearranged, then additional parameters may be added to represent the number of direct trunk slots currently in use by nodal services at each MUX location.

Iteration of Direct Trunk Sizing and MUX Location

Once the MUX optimization module has been completed, this information can be used to "re-size" the cost estimation of the direct trunk/access tandem trunks. Thereafter, the MUX optimization process can be re-done in light of any changes to the number of trunks and/or their assignments. The recursive nature of the inventive optimization technique allows for both cost and topology constraints to be fully addressed.

Extended Features of Optimization Technique

As mentioned above, one problem with prior art methods of access cost estimation is the inability to address the complexities of today's communication network. However, as will be described below, the dual-module approach of the present invention allows for a number of different variations in network topology and traffic demands to be incorporated into the sizing and/or MUX location analyses.

Figure 6:
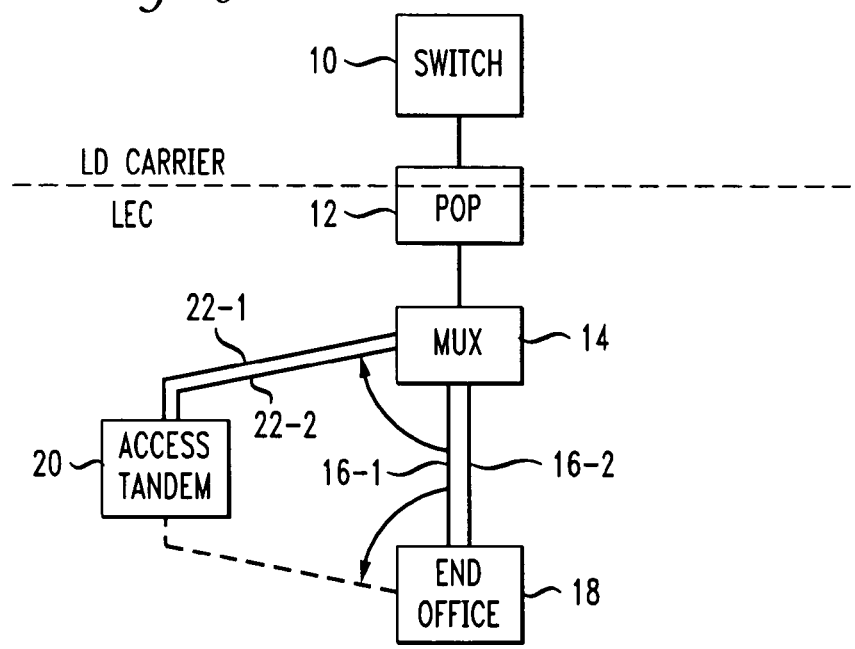
FIG. 6 illustrates an alternative network topology using parallel trunk groups.

FIG. 6 illustrates one example of an additional network complexity, the presence of parallel trunk groups in the access arrangement. As shown, a pair of parallel trunk groups 16-1 and 16-2 is used between MUX 14 and end office 18, with a pair of parallel trunk groups 22-1 and 22-2 used between MUX 14 and access tandem 20. Obviously, the parallel trunk groups could include a set of three parallel trunk groups, four parallel trunk groups, etc. Whenever two or more parallel trunk groups are in place in the LATA partition being evaluated, the methodology of the present invention first optimizes the network as though the parallel groups were just one over-sized group. After the optimization has been completed, the resulting trunk quantities are then allocated between the pair of trunk groups. If one of the trunk groups has a fixed size, then any trunk quantity changes are applied to the other trunk group. If neither group has a fixed size, then the methodology assumes that the largest group is at the maximum size and applies any trunk group quantity changes to the smaller trunk group.

Figure 7:
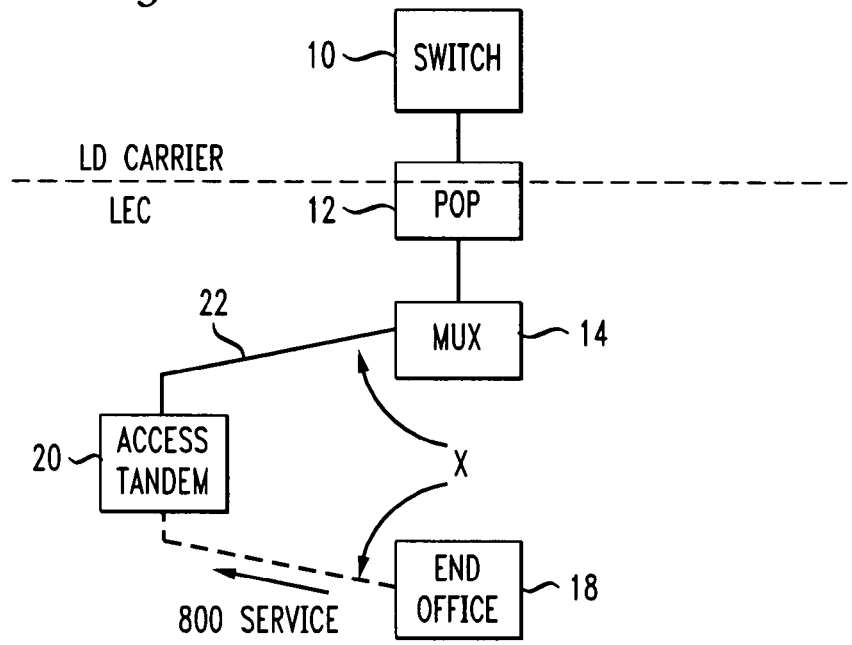
FIG. 7 illustrates yet another network topology where traffic from an end office is not permitted onto a direct trunk, such as for toll-free service database lookup.

FIG. 7 illustrates the situation where traffic originating at end office 18 is not permitted to access a direct trunk (such as in toll-free special services), since this traffic must first go to an access tandem switch 20 to perform a database lookup. In this case, any end office traffic that must go only to an access tandem is not considered as "eligible" traffic for the step of "sizing" the proper number of direct trunks for that end office. Rather, this traffic is applied directly to the access tandem trunk group.

Figure 8:
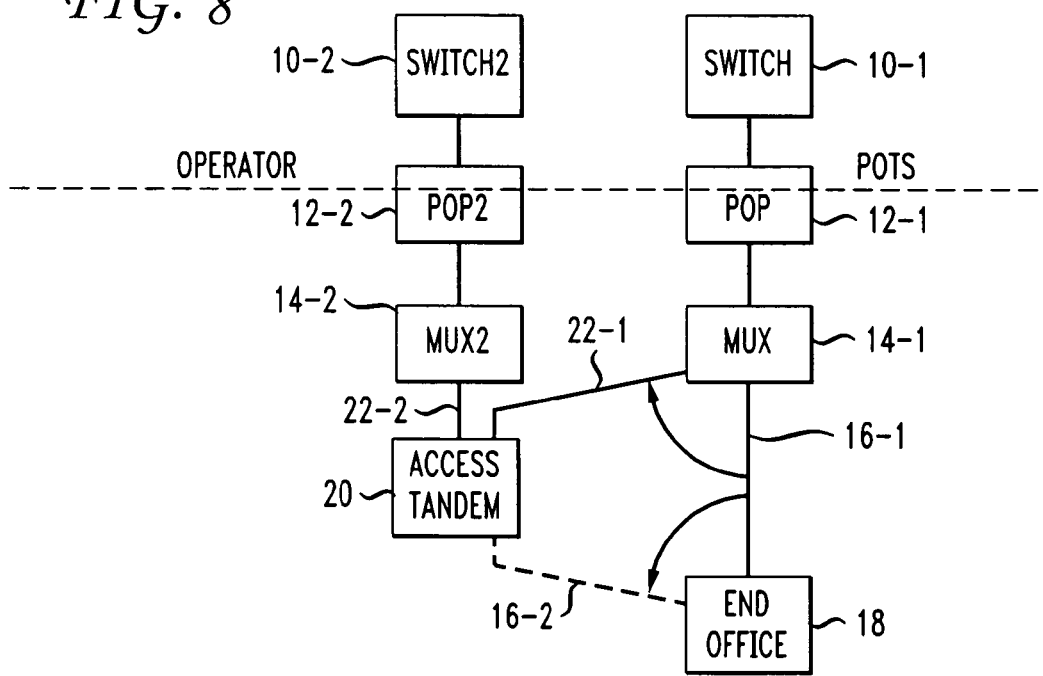
FIG. 8 illustrates a network topology where the traffic from one end office is destined for two different switches in the long distance carrier network.

Sometimes, part of the traffic at an end office may be assigned to a first long distance carrier switch, and other traffic assigned to a second long distance carrier switch. FIG. 8 illustrates this example. One reason for this may be the migration from one type of switch to an upgraded version of the switch. Other times, the traffic may correspond to different services (for example, operator-assisted services vs. POTS traffic). As shown in FIG. 8, the traffic originating at end office 18 is destined for either switch 10-1 or switch 10-2 in the long distance carrier's network, where switch 10-1 is associated with POTS traffic and switch 10-2 is associated with operator-assisted (i.e., "enhanced services") calls. Each switch is shown as having its own POP into the local exchange area network, with POP 12-1 associated with switch 10-1 and POP 12-2 associated with switch 10-2. Since trunk group 16-2 between end office 18 and access tandem 20 carries a mix of traffic from various carriers, it is sized by the local exchange carrier (thus the long distance carrier pays a minutes-of-use charge). In this example, traffic to switch 10-2 must travel via access tandem 20 and tandem trunk group 22-2. Traffic to switch 10-1 can either be directed onto direct trunk group 16-1, or it can overflow through access tandem 20 and onto tandem group 22-1.

Inasmuch as each direct trunk group is kept separate, the assignment of a single end office to two difference switches will not impact the direct trunk group sizing optimization portion of the inventive methodology. Any traffic not offered to a direct trunk group is then applied directly to the tandem trunk group. Sometimes, however, a portion of the traffic at an end office is assigned to a tandem switch or a long distance carrier switch in a different LATA. In these cases, the traffic may be given a different end office code, even though the same physical end office equipment is used. Such traffic is included in, and optimized with, the LATA to which it is coded.

Figure 9:
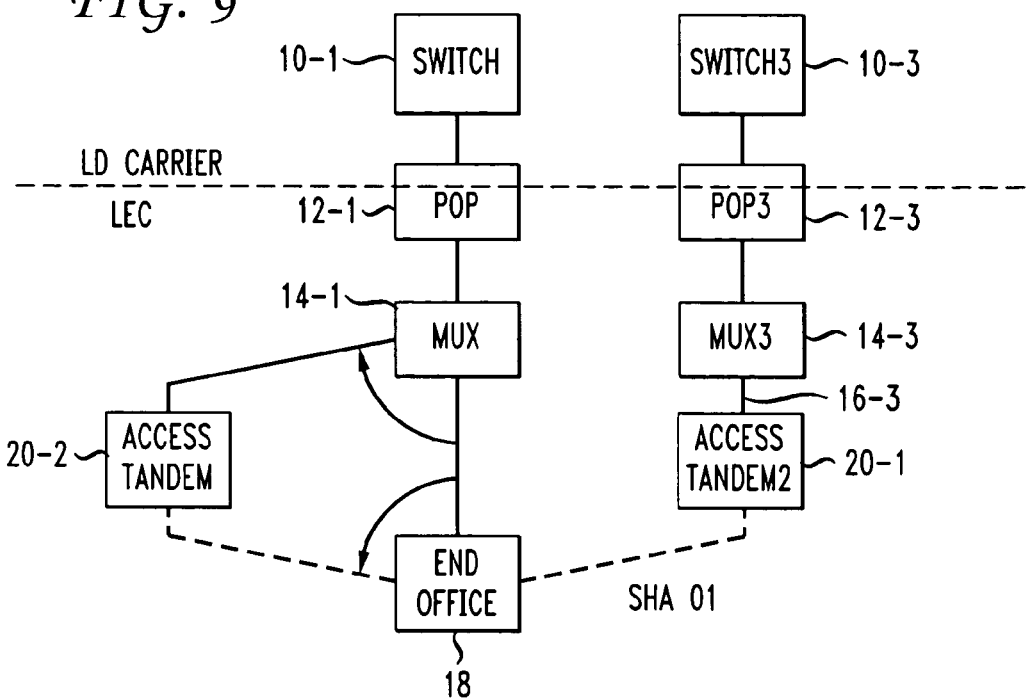
FIG. 9 illustrates a "shared homing" arrangement where an end office is "homed" onto two difference switches in the long distance carrier network.

The traffic at an end office may also be split between two different access tandems, in what is referred to as a "shared homing arrangement" (SHA). FIG. 9 illustrates this configuration, including the use of a pair of access tandems, 20-1 and 20-2, both connected to end office 18. This particular network configuration is then handled in a manner similar to the multiple long distance switch arrangement as discussed above in associated with FIG. 8, where each direct trunk group maintains its separate identity and is "sized" independently in the process of the present invention.

Figure 10:
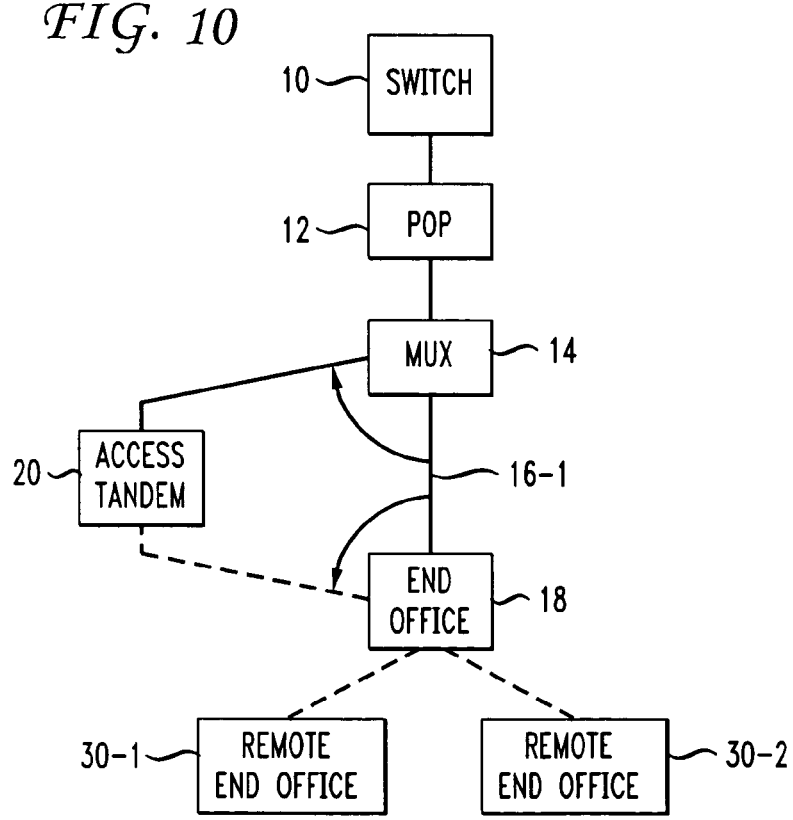
FIG. 10 illustrates an network topology where a pair of "remote" end offices (no direct trunk access) are homed onto a single end office.

FIG. 10 illustrates a network arrangement including a pair of remote end offices 30-1 and 30-2 beyond the local access network's end office 18. Many of the smaller end offices contain only remote switching modules, referred to as remote offices. Each remote end office is assigned a "host" end office 18. The long distance carrier pays a host/remote minutes-of-use transport charge to connect these offices to their host end office. Since this cost is independent of the design decision, it is not included in the optimization methodology of the present invention. However, the remote office traffic is combined with the host office traffic.

Figure 11:
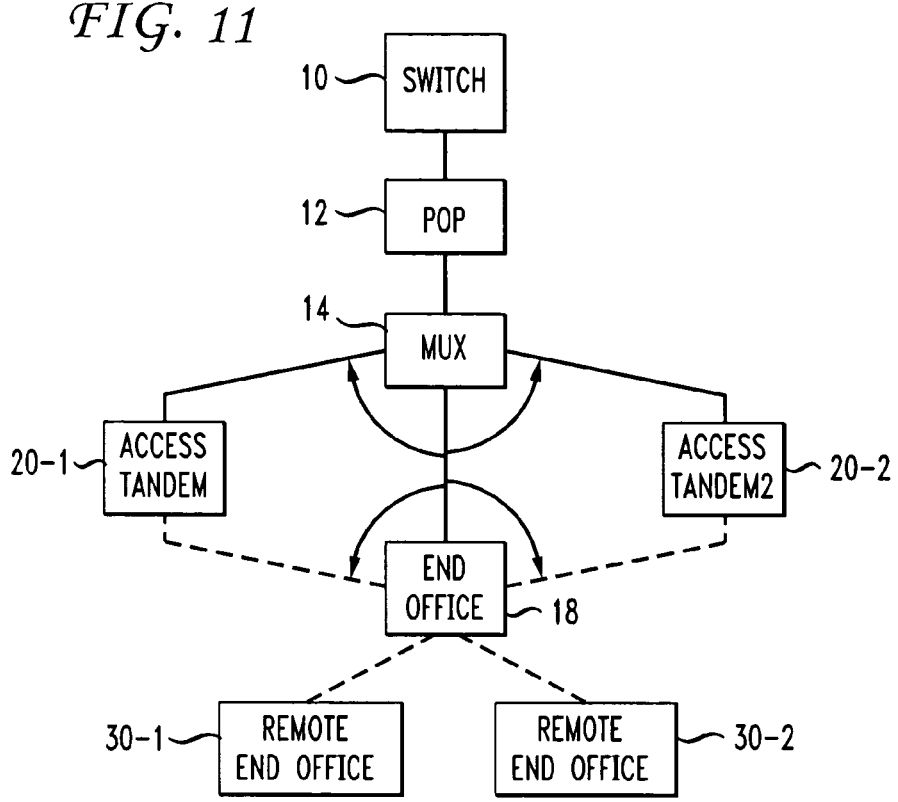
FIG. 11 illustrates a variation of the arrangement of FIG. 10, with a pair of access tandem switches also associated with a single end office.

There are some cases where traffic from different remote end offices of the same host end office may be offered to the same direct trunk group, but then overflow to two different access tandems, as illustrated in FIG. 11. In these cases, the optimization methodology of the present invention sizes the direct trunk group based on all of the offered traffic and then applies the overflow traffic to the appropriate tandem trunk group. When optimizing the direct trunk group, the method uses a weighted average of the appropriate tandem costs.

Figure 12:
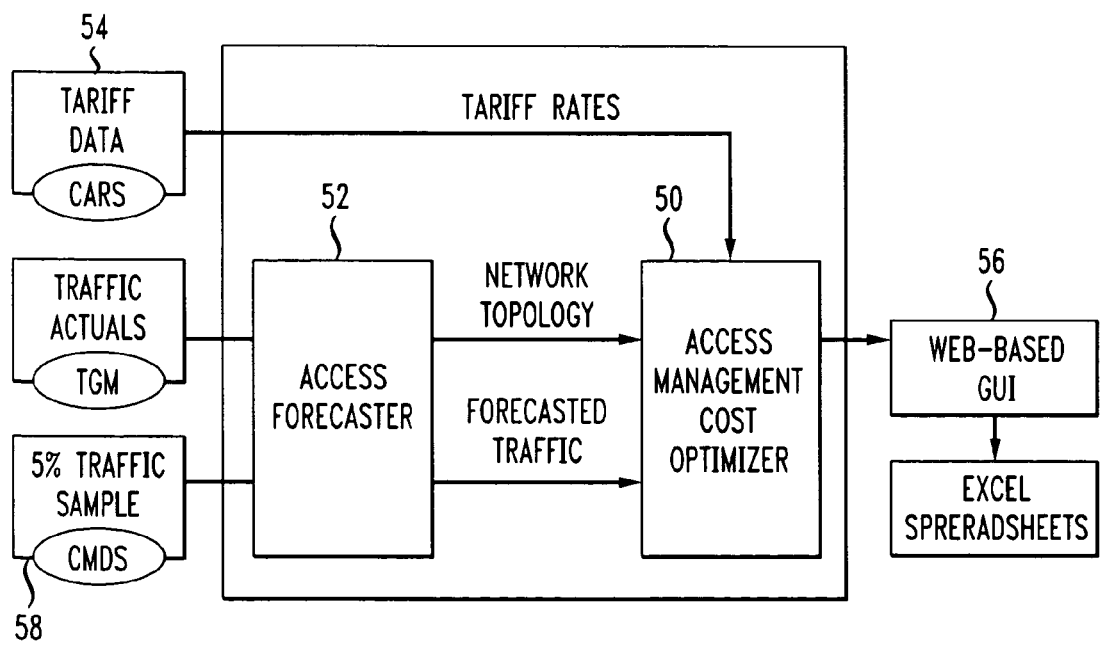
FIG. 12 is a block diagram of an exemplary architecture of the optimization methodology of the present invention.

FIG. 12 depicts, in a high level view, the architecture of the optimization methodology of the present invention. As shown, the network topology, forecasted traffic and trunk group location data from an access forecaster 52 is provided as an input to an access management cost optimizer 50 formed in accordance with the present invention. The tariff data is received from an access tariff database 54. Inventive access optimizer 50 is run in batch mode for each LATA when the new monthly forecast is received, and the results are placed in a database. Users of the system can then access these results through a web-based graphical user interface (GUI) 56 available through the Internet, or viewed in spreadsheet form from module 57. Access forecaster 52 provides a 12 month projection of all access trunk group loads partitioned by the required routing. The partition is generated by a simulated routing of calls from the CMDS 5% monthly sample 58 of all billed calls in the long distance network, as well as actual traffic data from database 60.

FIG. 13 shows a sample Access Optimizer project screen available through GUI 56 of FIG. 12. Each tandem trunk group and its associated direct trunk groups is referred to as a "project". Users can search for specific "projects" using a variety of search criteria. By clicking on a field in the Access Tandem (ATDM) column, the system then presents a second window listing the specific trunk groups in the project, along with the set of changes recommended by the access optimizer of the present invention. In addition, users can download detailed pricing information into a spreadsheet.

Traffic patterns typically vary over the course of a year. Thus, the network capacity must be sufficient to satisfy the grade-of-service during the busy season, while minutes-of-use charges must be averaged over the entire year. Certain locations, such as resorts, exhibit demands that are extremely seasonal. This represents an opportunity for additional savings by planning for a basic yearly load, and then arranging for seasonal "adds" and "disconnects" to cover the peak season. This strategy will be beneficial when seasonal variation is large enough to offset long-term contract discounts and connect costs.

Figure 14:
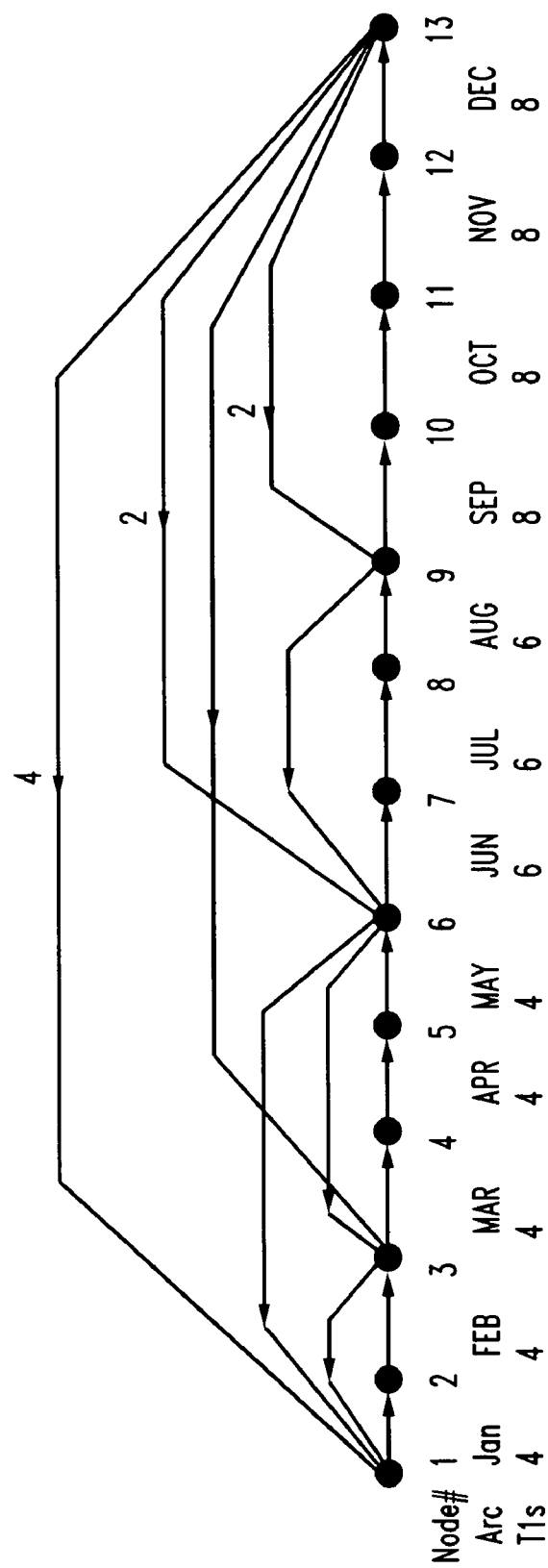
FIG. 14 is a flow diagram that may be used to analyze and adjust sizing requirements of direct trunks to account for seasonal variations.

One approach is to use a network flow model. The flow model, similar to a model used in an operator scheduling application, consists of 12 forward arcs, as shown in FIG. 14, that represent the 12 months. They connect serially from nodes 1 to 13. The lower bounds on the flows in these arcs correspond to the monthly demands for direct trunks. The backward arcs represent potential direct trunk service intervals, and the resulting flows indicate the optimal service intervals and the corresponding number of direct trunks that are required.

The flow model as illustrated in FIG. 14 can also be stated as a linear program, and is guaranteed to have an integer solution. The model determines the number of trunks by month to account for seasonal variations. In its current form, it accounts for one direct trunk group at a time, assumes traffic engineering has been done individually for twelve months, and proper balance has been calculated to account for overflow traffic charged by minutes of use. The following parameters and variables can be used in the linear program:

$C_a$: the cost of a trunk for the period represented by a backward arc a $x_a$: the flow on arc a, with forward arcs representing the number of trunks required for that month and backward arcs representing the number of trunks in place for that same period of time; and $T_a$: the minimum number of trunks required during the month represented by a forward arc a.

Then, the objective function is simply to minimize the total cost of the trunks, as shown by the following:

$$\text{Min} \sum_a C_a x_a.$$

The total flow on each of the arcs originating at each node n must equal the total flow on each of the arcs terminating at node n:

$$\sum_{a \text{ originates at } n} x_a - \sum_{a \text{ termminates at } n} x_a = 0 \ \forall \, n.$$

Finally, there must be enough flow on each forward arc to satisfy the minimum number of trunks for that month:

$$x_a \geq T_a \forall a.$$

Inasmuch as the present invention is subject to many variations, modifications and changes in detail, it is intended that all matter described throughout this specification and shown in the accompanying drawings be interpreted as illustrative only, and not in a limiting sense. Accordingly, it is intended that the present invention be limited only by the spirit and scope of the claims appended hereto.

What is claimed is:

1. A method of optimizing access connections between a long distance carrier and a local exchange carrier network so as to minimize access charges paid by the long distance carrier, the method comprising the steps of:
   a) partitioning the local exchange carrier network into a plurality of separate geographic areas, each separate geographic area including a plurality of end offices;
   b) for each partition created in step a), defining a plurality of network elements associated with access charges, including long distance carrier points-of-presence (POPs), multiplexers (MUX's), end offices, direct trunks, access tandem switches, access tandem trunks;
   c) for each end office in each partition, determining a minimal cost architecture of direct trunks, access tandem trunks and access tandem switches as a function of forecasted traffic volume;
   d) for each partition including at least one multiplexer, determining an optimal assignment and location for each multiplexer and associated high capacity facilities using a mixed integer program including the following parameters:

$c_{em}$: cost of a trunk from endpoint e to its POP;

$c_m$: cost of a multiplexer and a high capacity facility from MUX location m to its POP; and $D_e$: total number of trunks required to endpoint e and the following decision variables:

$x_e$: number of trunks from endpoint e to its POP;

$y_{em}$: number of trunks from endpoint e to MUX location m; and $z_m$: number of high capacity facilities from MUX location m to its POP, where the mixed integer program objected is defined as:

$$\text{Min} \sum_e c_e x_e + \sum_e \sum_m c_{em} y_{em} + \sum_m c_m z_m$$

and, based on the optimal assignment, e) re-determining the minimal cost architecture of step c) and updating the optimal assignment and location results for each multiplexer; and f) combining the results for each end office in each partition to determine an optical access network topology with minimal access charges.

2. The method as defined in claim 1 wherein in performing step a), the local exchange carrier network is partitioned into a plurality of Local Access Transport Areas (LATAs).

3. The method as defined in claim 1 wherein in performing step c), the following steps are performed for each partition:

1) identifying an initial end office for sizing analysis;

2) determining the cost of a direct trunk group from the identified end office to its associated POP;

3) determining if the number of trunks in the identified direct trunk group can be modified;

4) if the number cannot be modified, selecting another end office and returning to step 2), otherwise:

5) for each possible number of direct trunks, defining an amount of overflow traffic;

6) for each possible number of direct trunks, calculating access charges including access tandem charges for the defined overflow traffic of step 5);

7) finding a minimum value of access charges from each value calculated in step 6) to use as defining an optimum number of direct trunks and access tandem charges for that end office; and 8) selecting another end office and returning to step 2).

4. The method as defined in claim 3 where in performing step 5), the overflow is defined by:

determining a yearly overflow traffic volume;

dividing the yearly overflow value by 12 to define an average monthly overflow;

determining a "busy hour" overflow; and combining the average monthly overflow and "busy hour" overflow to define the end office overflow.

5. The method as defined in claim 1 wherein the mixed integer program includes a first constraint that the total number of direct trunks at each endpoint e must equal the total demand:

$$x_e + \sum_m y_{em} = D_e, \quad \forall e.$$

6. The method as defined in claim 5 wherein the mixed integer program further includes a second constraint that the total number of high capacity facilities at each MUX location m is sufficient to carry the trunks homed to that MUX, defined as:

$$\sum_e y_{em} - 28 z_m \leq 0, \quad \forall m.$$

7. The method as defined in claim 6 wherein the mixed integer program includes a third constraint that all trunks from the same endpoint e must be assigned to the same MUX location m, defined as:

$x_e, y_{em}, z_n \geqq 0 \, \forall e, m$ $z_m$ integer $\forall m$, and $u_e, v_{em} \in e, m$.

* * * * *